US012777073B2

(12) United States Patent
Shpilyuck et al.

(10) Patent No.: US 12,777,073 B2
(45) Date of Patent: Oct. 27, 2026

(54) AUTOMATIC NETWORK POLICIES GENERATION IN CONTAINERIZED ENVIRONMENTS

(71) Applicant: Dell Products L.P., Round Rock, TX (US)

(72) Inventors: Boris Shpilyuck, Ashdod (IL); Igor Dubrovsky, Beer-Sheva (IL); Nisan Haimov, Beer-Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 306 days.

(21) Appl. No.: 17/931,761

(22) Filed: Sep. 13, 2022

(65) Prior Publication Data

US 2024/0089291 A1 Mar. 14, 2024

(51) Int. Cl.
*H04L 9/40* (2022.01)

(52) U.S. Cl.
CPC .......... *H04L 63/20* (2013.01); *H04L 63/1416* (2013.01); *H04L 63/1466* (2013.01)

(58) Field of Classification Search
CPC .. H04L 63/20; H04L 63/1416; H04L 63/1466
See application file for complete search history.

(56) References Cited

U.S. PATENT DOCUMENTS

| | | | | |
|---|---|---|---|---|
| 2021/0211408 | A1* | 7/2021 | Porras | G06F 11/3409 |
| 2022/0164186 | A1* | 5/2022 | Pamidala | G06F 18/2155 |
| 2022/0311783 | A1* | 9/2022 | Meena | G06N 20/00 |

* cited by examiner

*Primary Examiner* — William R Korzuch
*Assistant Examiner* — Forrest L Carey
(74) *Attorney, Agent, or Firm* — Amin, Turocy & Watson, LLP

(57) ABSTRACT

Technology described herein relates to limiting microservice operation in response to security compromise of the microservice. A method can comprise facilitating, by a system operatively coupled to a processor, transmitting, to a container orchestrator controller that is part of a communication network, a network policy that, in response to deployment, operates to restrict, according to a restriction defined by the network policy, access between a first microservice and a second microservice of the communication network different from the first microservice, and instructing, by the system, the network policy to be deployed by the container orchestrator controller, to restrict, according to the restriction and in response to detection of a malfunction of the first microservice related to an intrusion to the first microservice, first connections employed during a flow between the first microservice and the second microservice by default and second connections that are not employed by default during the flow.

20 Claims, 10 Drawing Sheets

AUTOMATIC NETWORK POLICIES GENERATION IN CONTAINERIZED ENVIRONMENTS

BACKGROUND

Microservices, or microservice architecture, is a computer architecture that can structure an application, software, operation and/or the like as a collection of services that can be independently deployable relative to one another, such as over a cloud or network. Microservices can access one another to perform operations as part of the execution of an overall operation comprising the operations.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example method can comprise facilitating, by a system operatively coupled to a processor, transmitting, to a container orchestrator controller that is part of a communication network, a network policy that, in response to deployment, operates to restrict, according to a restriction defined by the network policy, access between a first microservice and a second microservice of the communication network different from the first microservice. The method further can comprise instructing, by the system, the network policy to be deployed by the container orchestrator controller, to restrict, according to the restriction and in response to detection of a malfunction of the first microservice related to an intrusion to the first microservice, first connections employed during a flow between the first microservice and the second microservice by default and second connections, between the first microservice and the second microservice, that are not employed by default during the flow.

An example system can comprise a processor, and a memory that stores executable instructions that, when executed by the processor, facilitate performance of operations. The operations can comprise analyzing network information relating to operation of a network to determine dependencies of a microservice operating via the network with other microservices operating via the network other than the microservice, based on a result of the analyzing of the network information to determine the dependencies of the microservice with the other microservices, determining a network policy comprising a restriction applicable to restrict a subset of the operating, of the microservice via the network, that uses the dependencies with the other microservices; and propagating the network policy to a container orchestrator controller.

An example non-transitory computer-readable medium can comprise executable instructions that, when executed by a processor, can facilitate performance of operations. The operations can comprise detecting an unapproved intrusion occurrence with respect to a first microservice deployed via a network, determining that a performance of the first microservice has been compromised by the unapproved intrusion, and executing a restriction of access between the first microservice and a second microservice deployed via the network and being different than the first microservice, wherein the restriction is determined based on an analysis of a dependency between the first microservice and the second microservice.

An advantage of one or more of the above-indicated method, system and/or non-transitory computer-readable medium can be lack of reliance on human intervention, and thus prevention of human error. Likewise, another advantage can be lack of use of a predictive access limitation method that can undesirably provide both false negative non-limitations and false positive limitations.

In one or more embodiments of the above-indicated method, system and/or non-transitory computer-readable medium, the network policy can comprise a limitation on ingress of access to the compromised microservice and/or a limitation on egress of access by the compromised microservice. A respective advantage can comprise the ingress and/or egress limitation being based on a defined and/or discovered dependency. This can provide for a reliable limitation that is neither overprotective, including more microservices than needed, nor underprotective, not including sufficient microservices in the limitation.

In one or more embodiments of the above-indicated method, system and/or non-transitory computer-readable medium, the framework further can provide for communication of a network policy to an external service, such as a service that is deployed external to the network. A respective advantage can comprise propagation of a network policy beyond a network, where the propagation can be self-serving, such as where the external service could be an unintended spreader of a complication caused by a microservice intrusion.

BRIEF DESCRIPTION OF THE DRAWINGS

The technology described herein is illustrated by way of example and not limited in the accompanying figures in which like reference numerals indicate similar elements.

DETAILED DESCRIPTION

Overview

Figure 1:
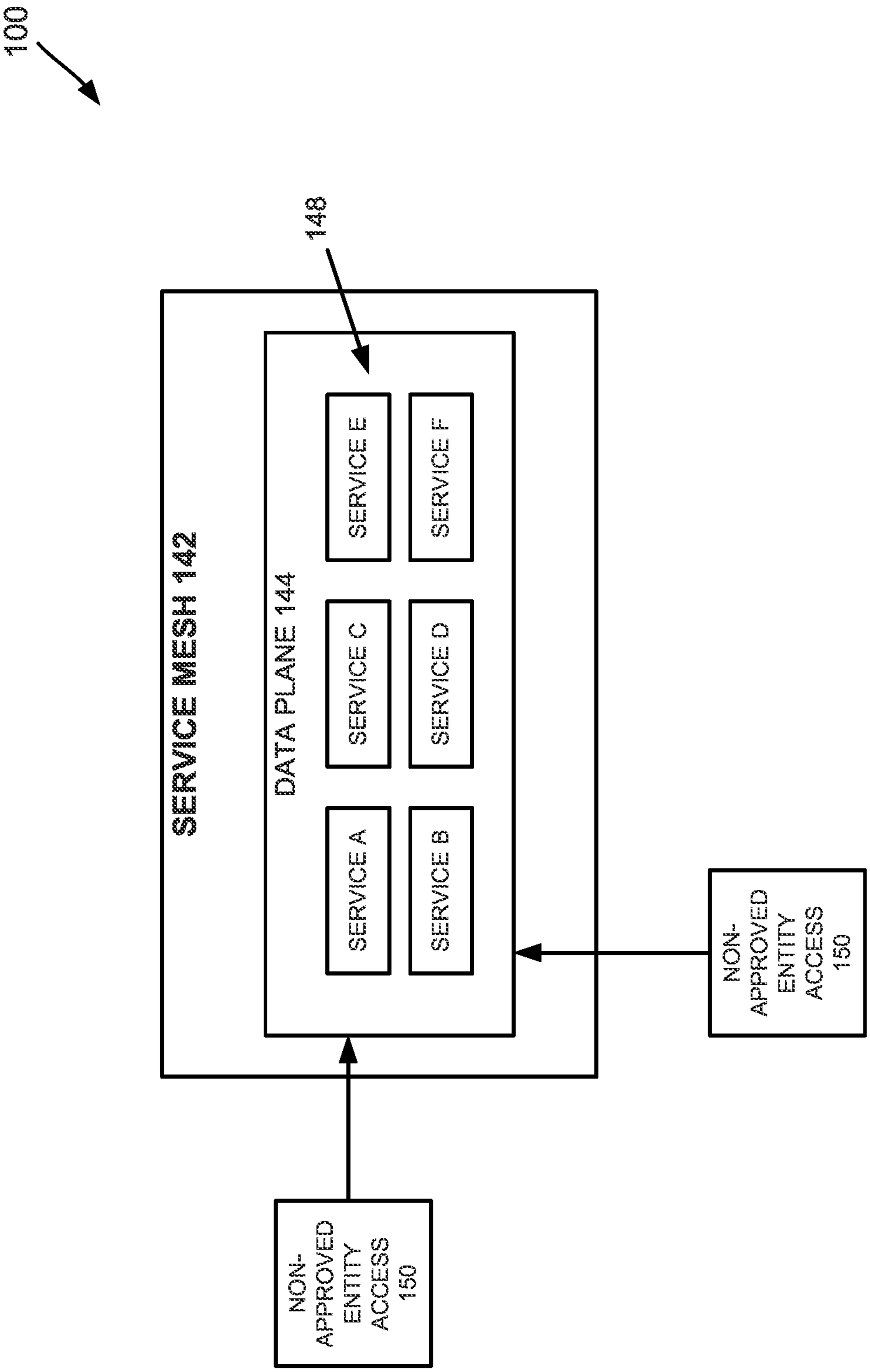
FIG. 1 illustrates a block diagram of a part of a network microservice system, in accordance with one or more embodiments and/or implementations described herein.

The technology described herein is generally directed towards microservices and security processes related to microservices deployed at a network. Such microservices can be comprised by and/or comprise one or more containerized environments.

Whether over a network, over the cloud, or both, microservices can interact with one another to perform operations as part of an overall global operation comprising the operations. That is, microservices can be deployable containerized programs, applications, software and/or the like that can communicate with one another. Data (which can include metadata) can be transferred between the microservices. Data from one microservice can be employed as in input, limitation and/or the like for another microservice.

In one or more embodiments, microservices can be configured to interact with one another by default, such as to complete an overall global operation. For example, various microservices over a network can interact with one another automatically to complete a business operation such as a commercial purchase transaction.

In the unintended scenario where one microservice of a plurality of microservices that interact with one another is compromised, such as by an unintended or unapproved interaction, one or more processes can be performed to limit the effect of the unintended microservice compromise. The compromise can be a security compromise, such as a hack and/or comprising a virus, code change, and/or the like.

That is, it can be desired by administrator entities of a network at which the plurality of microservices are deployed to limit and/or prevent further unintended consequences of the initial intrusion, such as including compromise of one or more additional microservices of the plurality of microservices. Such additional compromise can be caused by interactions between the microservices, thus causing propagation, to one or more additional microservices, of a complication affecting the initially compromised microservice.

In an existing framework, network policies can be manually created to restrict access to a compromised microservice by another particular microservice, or to restrict access of another particular microservice by a compromised microservice. The intent is to avoid total restriction, thus preventing complete use of a plurality of microservices, a majority of which may not be compromised. However, this framework introduces human error, improper restriction, and/or the like. Furthermore, such framework can be inefficient. For example, for an application that can comprise hundreds or thousands of microservices, such manual task can be extensive and increasingly error prone due to the number of microservices.

In another existing framework, predictive limitation of access based on particular microservices can be employed. However, a predictive approach can block any access that violates a learned pattern, thus leading to false positive blocking and/or false negative non-blocking. This can result in application failure and/or negative business impact. Such framework also can be vulnerable to intrusion during a learning and/or training.

To account for one or more of the aforementioned deficiencies with existing security frameworks for microservices, such as deployed over a network, one or more embodiments herein provide a framework for limiting and/or preventing propagation of a result of an unintended or unapproved intrusion at one microservice to additional microservices of a plurality of microservices deployed at a network. The framework can provide for identification of an intrusion, determination of dependencies between microservices at a plurality of microservices, generation of a network policy to limit and/or prevent propagation of an unintended effect of the intrusion to an additional microservice, and/or propagation of the network policy to one or more additional microservices. The network policy can comprise a limitation on ingress of access to the compromised microservice and/or a limitation on egress of access by the compromised microservice. In one or more embodiments, the framework further can provide for categorization of the dependencies and/or communication of a network policy to an external service, such as a service that is deployed external to the network.

Indeed, if a microservice is already compromised and a system is able to restrict the access only to this microservice's business relevant peers, such as only to a part of a whole set of microservices deployed at a network, fewer microservices (and/or services external to the network, such as external application programming interfaces) can be impacted by the intrusion. This can allow for minimizing a risk to the network, for reducing time and effort to resolving a consequence of the intrusion, and for better solution maturity and resiliency, as compared to existing frameworks.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

As used herein, the term "data" can comprise "metadata".

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1-6 and/or with other figures described herein.

Turning first to FIG. 1, an exemplary microservice architecture 100 is illustrated comprising a service mesh 142. The service mesh 142 can be provided over a cloud and/or over a network.

The service mesh 142 comprises at least a data plane 144. In one or more other embodiments, the service mesh can comprise additional planes, such as a control plane that can be accessible by a controller, such as a container orchestrator controller. It will be appreciated that network polices can be propagated to the service mesh 142 directly, such as to a control plane, or the network policies can be first propagated to a container orchestrator controller and then to the service mesh 142.

As illustrated, the data plane 144 comprises a plurality of services 148, including services A, B, C, D, E and F. Also as illustrated, the service mesh 142 can be subject to one or more non-approved entity accesses 150, such as by an intruding entity. Such non-approved entity access 150 can comprise a virus, unapproved coding, access and/or the like.

Figure 2:
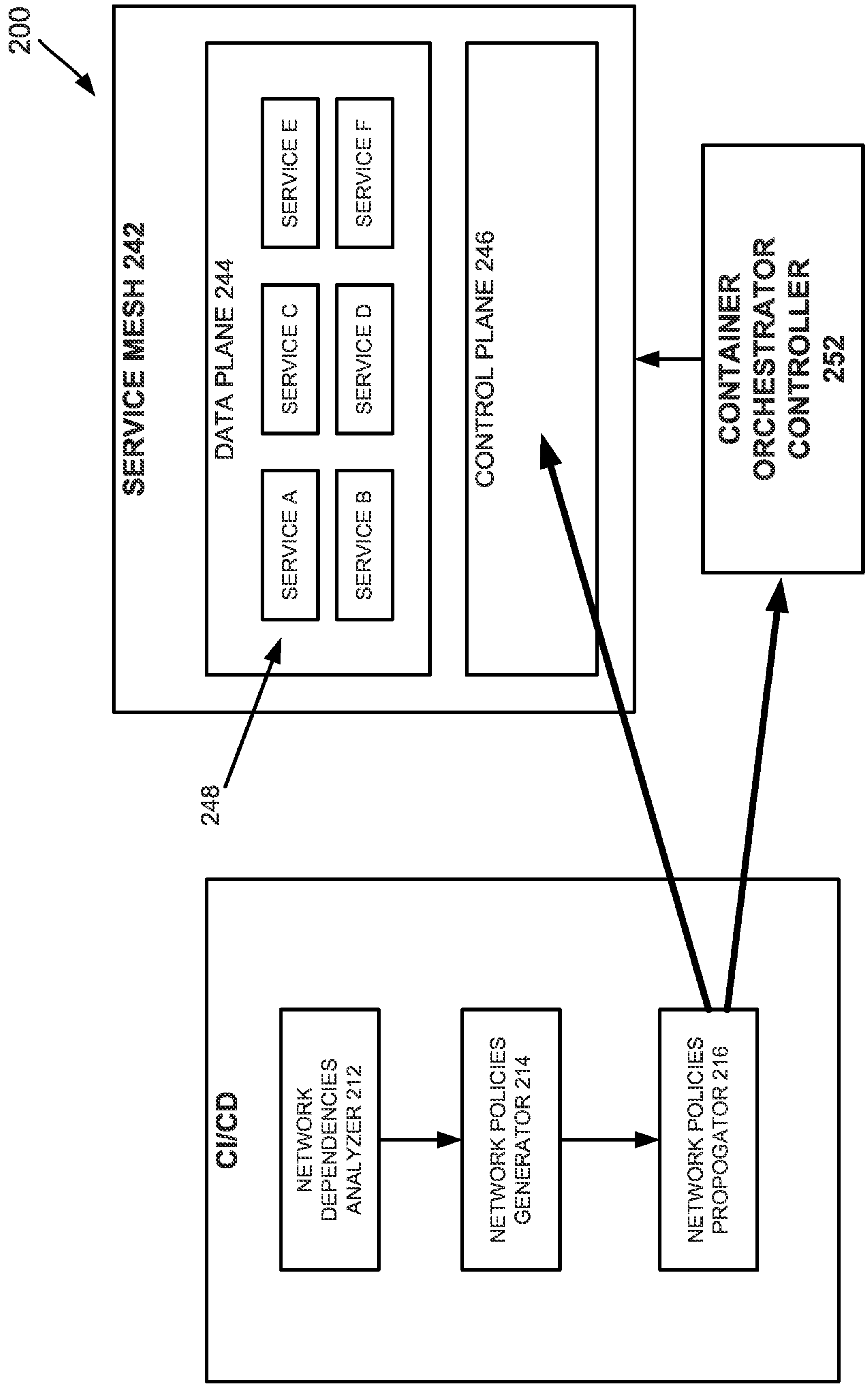
FIG. 2 illustrates a block diagram of a part of a network microservice system, in connection with one or more continuous integration and continuous deployment processes, in accordance with one or more embodiments and/or implementations described herein.

Looking next to FIG. 2, a network architecture 200 is illustrated comprising a service mesh 242 having a plurality of services 248 deployed at the network.

The service mesh 242 comprises a data plane 244 and a control plane 246. In one or more other embodiments, the service mesh can comprise additional planes. It will be appreciated that network polices can be propagated to the service mesh 242 directly, such as to a control plane, or the network policies can be first propagated to a container orchestrator controller 252 and then to the service mesh 242, such as by using the control plane 246. As illustrated, the data plane 244 comprises a plurality of the services 248, including services A, B, C, D, E and F.

Also at the network architecture 200 is a set of components for facilitating a continuous integration and continuous deployment of network polies to the service mesh 242. As illustrated, the components can comprise a network dependencies analyzer 212, a network policies generator 214 and a network policies propagator 216. The network policies propagator 216 can propagate a network policy generated by the network policies generator 214. The network policy can be based on an output of the network dependencies analyzer 212. The network policy can be propagated, by the network policies propagator 216, to the container orchestrator system 252 or more directly to the control plane 246 of the service mesh 242, for facilitating implementation of the network policy.

Figure 3:
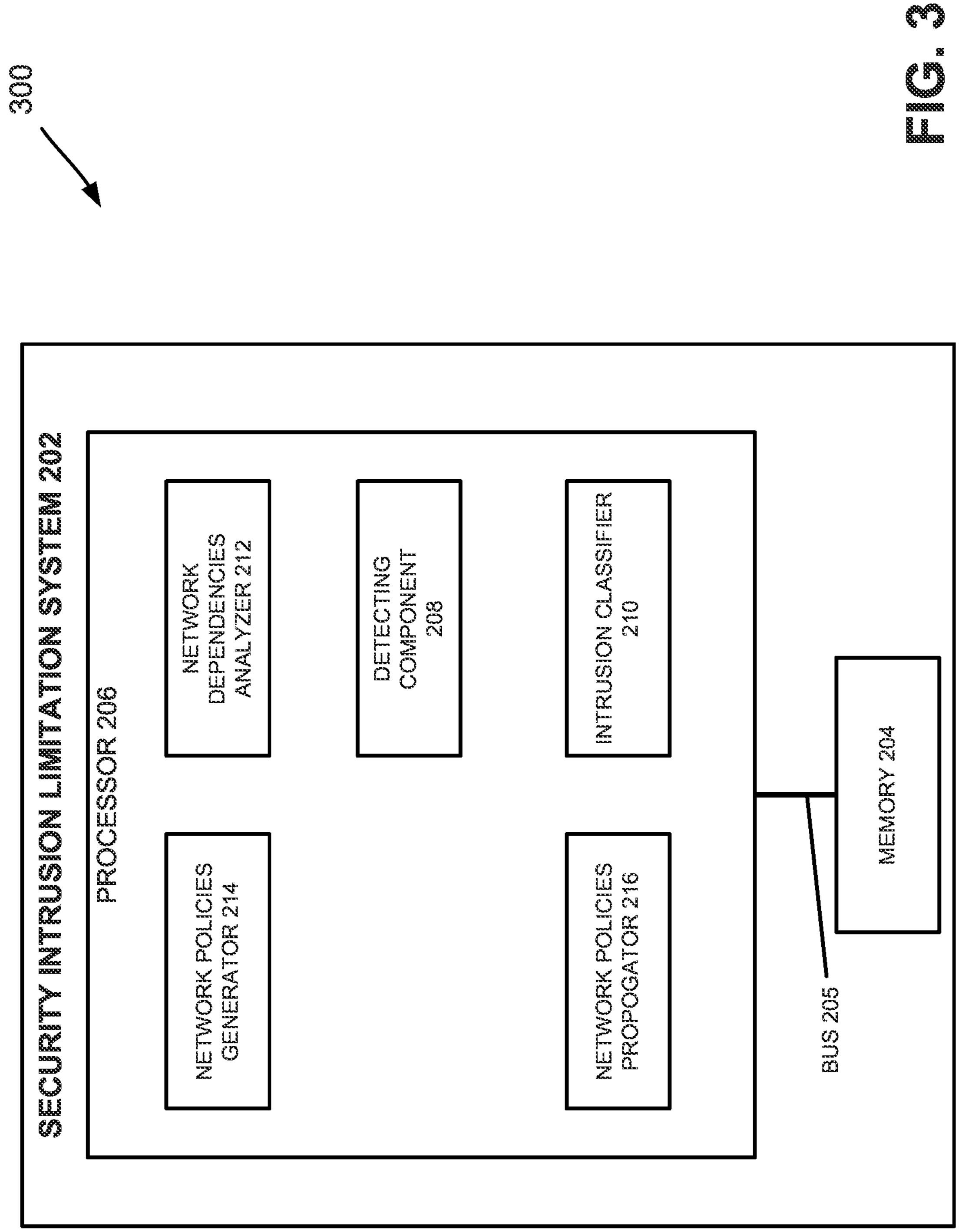
FIG. 3 illustrates yet a block diagram of a microservice security intrusion limitation system, in accordance with one or more embodiments and/or implementations described herein.

Turning next to FIG. 3, an architecture 300 is illustrated comprising a security intrusion limitation system 202 that can function to aid the service mesh 242 (FIG. 2). Generally, the security intrusion limitation system 202 can function to detect a non-approved intrusion to a microservice, such as of the service mesh 242, and to address the non-approved intrusion. The addressing can be directed to limiting and/or preventing further intrusion to one or more additional microservices and/or to limiting and/or preventing propagation of a consequence of the non-approved intrusion, such as a malfunction caused by a virus.

Put another way, during deploy time and/or upon creation or code change, as examples, of a first microservice, the security intrusion limitation system 202 can analyze the source code of the first microservice to determine a set of "peer microservices" of the first microservice (e.g., microservices that the first microservice communicates/interacts with) and can use this information for automatic generation of network policies related to microservice security. Then at run time, a container orchestrator system or service mesh can use those network policies to allow traffic only to "valid" microservices, such as in the event of a detected intrusion to the first microservice. As used herein, "valid" can refer to only those microservices that need to be interacted with to complete a global operation, such as a business transaction. In one or more other embodiments, at run time, a container orchestrator system or service mesh can use those network policies to allow traffic only to less than the "valid" microservices, such as depending upon the level of intrusion to the first microservice and/or upon a resulting consequence, such as a malfunction, due to the intrusion to the first microservice.

Generally, the security intrusion limitation system 202 can comprise any suitable computing devices, hardware, software, operating systems, drivers, network interfaces and/or so forth. As illustrated, the security intrusion limitation system 202 comprises the network dependencies analyzer 212, network policies generator 214, and network policies propagator 216. The security intrusion limitation system 202 also comprises a detecting component 208 and an intrusion classifier 210. These components are comprised by a processor 206. Although, in one or more other embodiments, any one or more of these components can be external to the processor 206. A bus 205 operatively couples the processor 206 and a memory 204.

Communication among the components of the security intrusion limitation system 202 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 206, memory 206 and bus 205 of the security intrusion limitation system 202.

In one or more embodiments, the security intrusion limitation system 202 can comprise a processor 206 (e.g., computer processing unit, microprocessor, classical processor and/or like processor). In one or more embodiments, a component associated with security intrusion limitation system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component (s) and/or instruction(s).

In one or more embodiments, the security intrusion limitation system 202 can comprise a machine-readable memory 204 that can be operably connected to the processor 206. The memory 204 can store computer-executable instructions that, upon execution by the processor 206, can cause the processor 206 and/or one or more other components of the security intrusion limitation system 202 to perform one or more actions. In one or more embodiments, the memory 204 can store computer-executable components.

The security intrusion limitation system 202 and/or a component thereof as described herein, can be communicatively, electrically, operatively, optically and/or otherwise coupled to one another via a bus 205 to perform functions of non-limiting system architecture 300, security intrusion limitation system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, security intrusion limitation system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the security intrusion limitation system 202 can reside in the cloud, and/or can reside locally in a local computing environment (e.g., at a specified location(s)).

In addition to the processor 206 and/or memory 204 described above, the security intrusion limitation system 202 can comprise one or more computer and/or machine readable, writable and/or executable components and/or instructions that, when executed by processor 206, can facilitate performance of one or more operations defined by such component(s) and/or instruction(s).

Figure 4:
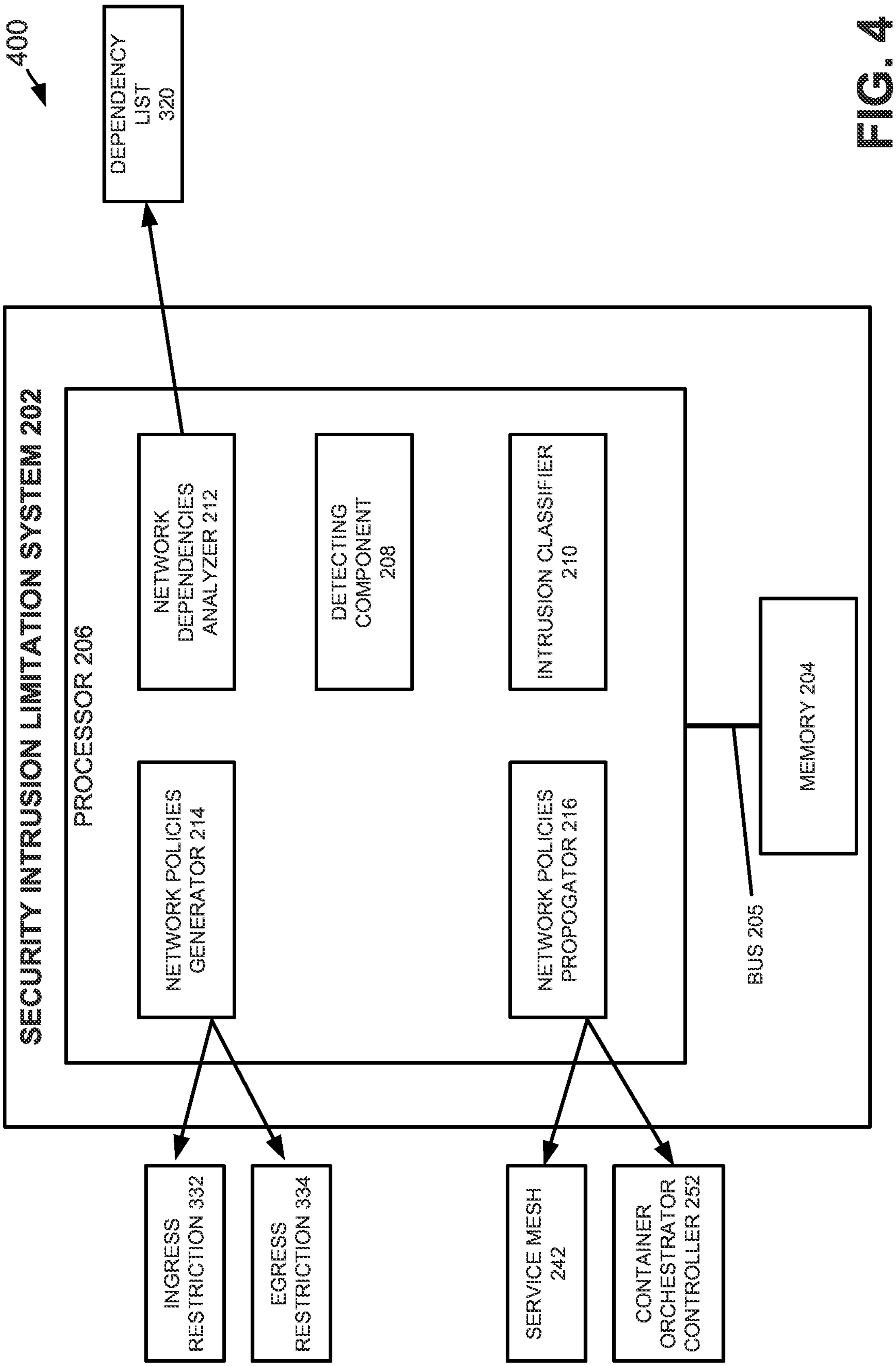
FIG. 4 illustrates another block diagram of the microservice security intrusion limitation system with one or more inputs or outputs of the system further being illustrated, in accordance with one or more embodiments and/or implementations described herein.

Looking next to FIG. 4, the security intrusion limitation system 202 is again illustrated, but now as part of a non-limiting architecture 400 along with one or more inputs and/or outputs of the security intrusion limitation system 202 for aiding in description of the various components of the security intrusion limitation system 202.

Turning first to the detecting component 208, this component can generally detect an intrusion at a microservice, such as a first microservice (e.g., Service A). The detection can be based on a flag, alert, notification and/or the like. The detection can be based on an analysis of functioning of the first microservice, such as where a consequence of the intrusion can lead to a malfunction of the first microservice. Such analysis need not be performed by the security intrusion limitation system 202. Rather, an output report from an analyzer ca be employed by the detecting component 208 to identify an intrusion.

Turning next to the intrusion classifier 210, this component can generally classify an intrusion according to a defined intrusion approval criterion, such as based on severity of the intrusion and/or based on severity of limitation of access that should be applied relative to the first microservice in view of the intrusion. For example, where an intrusion is less severe, a less severe reaction can be appropriate. In such case, it can be determined that the first microservice can be allowed to still interact with only other microservices necessary for conducting an operation using a select set of microservices. In such case, it can be recognized that the intrusion and/or an effect (e.g., consequence) of the intrusion could be allowed to propagate to this select set of microservices. However, this still can be understood as a limitation on the propagation of the intrusion and/or effect thereof.

In another case of more severe intrusion, a more severe reaction can be appropriate. In such case, it can be determined that the first microservice can be allowed only to interact with fewer than all microservices necessary to complete an operation. This can be understood as greater limitation on the propagation of the intrusion and/or effect thereof.

Such classifications can be employed by the network policies generator 214 in generating a network policy in response to the intrusion. It will be appreciated that the network policies generator 214 can function absent any classification of the intrusion, but rather upon only indication of the intrusion more generally.

Direction next turns first to the network dependencies analyzer 212. This component generally can determine dependencies of microservices relative to one another. As used herein, a "dependency" can comprise a use of a microservice, by another microservice, for completing an operation by the microservice. That microservice can rely on a communication, interaction and/or access of the other microservice to complete an operation. For example, one microservice can employ an output of another microservice as an input to a process. In another example, one microservice can proceed with an operation only upon a result from another microservice.

That is, relative to a plurality of microservices, such as a superset, of microservices that are deployed at a network, the network dependencies analyzer 212 can determine such dependencies relative to other microservices of the plurality. This process can be performed prior to, during and/or after deployment of the microservice at the network. Additionally and/or alternatively, this process can be performed prior to, during and/or after update and/or training of a microservice. Indeed, any such update or training can have an effect that can change (e.g., add/delete) a dependency of a microservice.

In one or more embodiments, the network dependencies analyzer 212 can analyze connections that are employed by a first microservice with other microservices during a business flow among the microservices. These connections can be classified as dependencies, with the other microservices with which the first microservice interacts being identified.

It will be appreciated that dependencies, such as connections between microservices, can be identified in a manner comprising classification of the dependencies themselves. For example, first connections of the dependencies can be identified as being related to a flow between a first microservice and a second microservice. Additionally, second connections of the dependencies can be identified as not being related to the flow between the first microservice and the second microservice, or not being used by default during the flow.

While additional steps can be involved, as described below, the first connections and the second connections identified can be employed and/or treated differently by the security intrusion limitation system 202. For example, the first connections, employed during the flow (e.g., a business transaction flow) can be determined to be allowed to continue, even in response to an intrusion. Differently, the second connections, not employed by default during the flow, can be determined to be disallowed to continue, in response to the intrusion. Still differently, both of the first connections and the second connections can be disallowed to continue, such as in response to an intrusion that satisfies a threshold of severity. Still differently, both of the first connections and the second connections can be allowed to continue, such as in response to an intrusion that does not satisfy a threshold of minimum severity. Such threshold(s) can be default and/or provided by an administrator entity.

In one or more embodiments, the network dependencies analyzer 212 can analyze network information to define dependency information comprising at least one of the aforementioned dependencies. The dependency information can be representative of respective protocol information representative of respective protocols for communications using the dependencies, namespace information representative of respective namespaces applicable to the dependencies, interface information representative of respective application programming interfaces for the communications using the dependencies, or port information representative of respective target ports associated with the dependencies.

Figure 5:
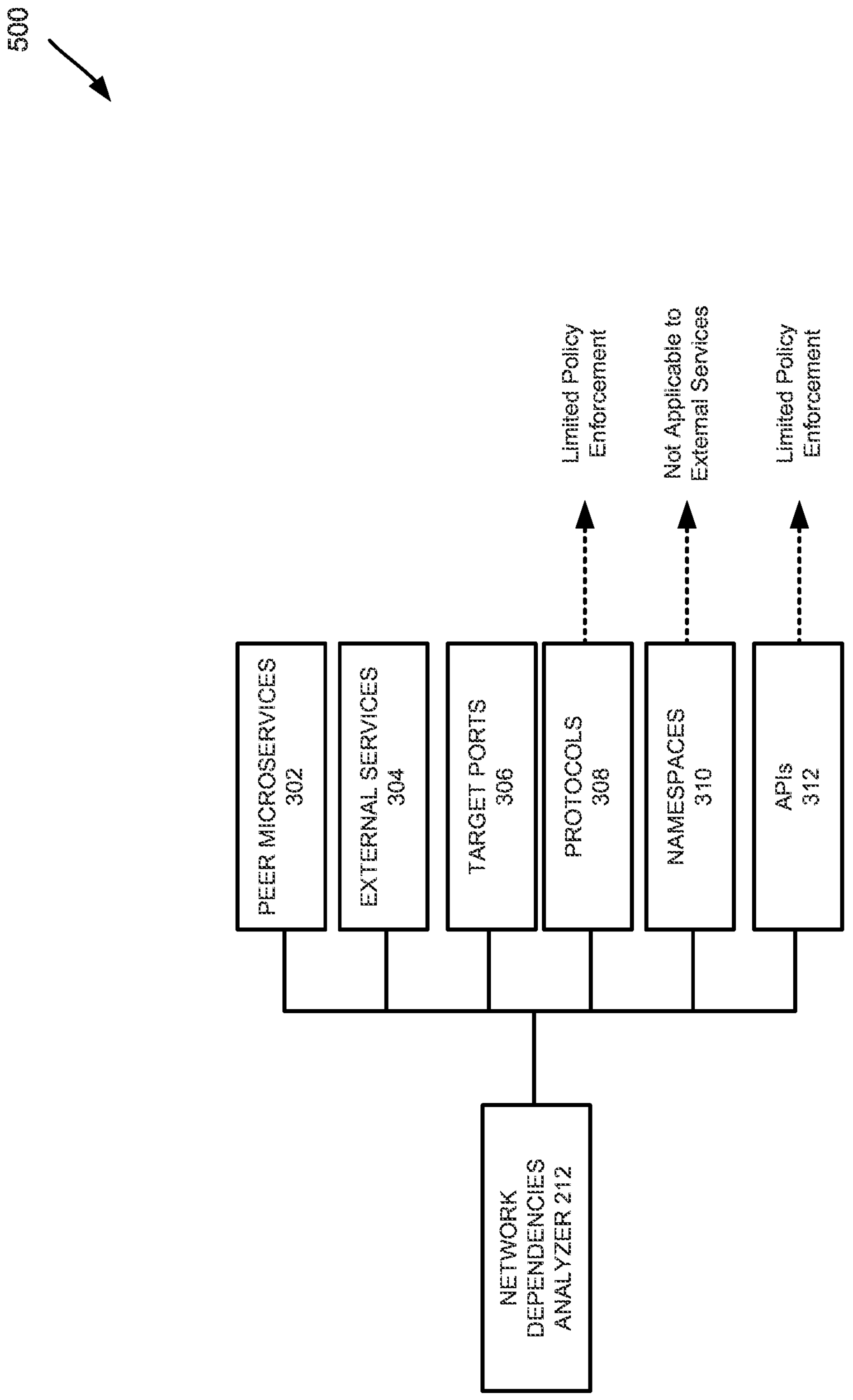
FIG. 5 illustrates a process flow diagram of one or more processes that can be performed by the microservice security intrusion limitation system of FIG. 3, in accordance with one or more embodiments and/or implementations described herein.

That is, turning briefly to FIG. 5, in addition still to FIG. 4, various aspects of network information can be employed by the network dependencies analyzer 212 to define one or more dependencies. These aspects of network information can comprise peer microservices 302, external services 304, target ports 306, protocols 308, namespaces 310 and/or application protocol interfaces (APIs) 312, without being limited thereto. APIs 312 can comprise hypertext transfer protocol (HTTP) methods, uniform resource locators (URLs), headers and/or the like. These network information aspects can be determined from network communications, network logs, microservice logs, microservice code, microservice configuration files, network configuration files and/or the like, without being limited thereto. For example, in an embodiment, network communications can be analyzed to determine connections between microservices where the analyzing comprises obtaining a namespace. Using the namespace, the network dependencies analyzer 212 can search for a uniform resource locator (URL) in a configuration file of a microservice.

In an example, namespaces can be determined from a continuous integration/continuous deployment (CI/CD) system employed by or in relation to the service mesh 242, for example.

In another example, URLs can be obtained by searching configuration files of a microservice. Information regarding peer microservices, external services, corresponding protocols, ports and/or namespaces can be obtained from URLs.

In an particular example, a configuration file of a product-pricer microservice can indicate that a peer microservice is "organizations", a target port is 8080, and a protocol is HTTP. In another example, domain name system (DNS) names employed and/or created by a container orchestrator (e.g., container orchestrator controller 252) can be of a predefined form, allowing for the network dependencies analyzer 212 to determine a namespace based on default understanding/background/setting based on the predefined form.

In one or more embodiments, aspects of network information can be obtained from more than one location. In one scenario, if a namespace is not defined explicitly in an URL, a target namespace received from a CI/CD system can be employed. Differently, if the namespace is defined in the URL, that namespace can be employed over that received from the CI/CD system. Differently, if the URL is related to an external service, namespace handling can be skipped for that external service. This can be because an external service can not be restricted, in one or more cases, by a network.

In still another example, a set of plugins can be employed to find communication "clients" through which the first microservice communicates with its peer microservices. The plugins can retrieve, obtain and/or provide additional URLs that were not listed in the configuration files. For example, a plugin for a popular open source client can locate a client because it is marked with a particular hash annotation. Thus, the plugin can provide a URL located in source code itself (e.g., by using static code analysis). Additional info of APIs can also be obtained in this manner.

In any of the aforementioned scenarios, the dependencies can be logged at a dependency list 320, which list can be employed by the network policies generator 214. Likewise, in any of the aforementioned scenarios, the other microservices upon which the first microservice depends can be logged at the dependency list 320, although the dependencies themselves can alternatively be logged in a manner that references those other microservices such as to be identified by another component using the dependency list 320.

Next, the network policies generator 214 can, based on the output of the network dependencies analyzer 212, such as the dependency list 320, generally determine and generate a network policy applicable to restrict at least a subset of the operating of the first microservice via the network.

For example, using the first connections that are employed during an operation flow, and using the second connections that are not employed during the operation flow, a network policy can be generated by the network policies generator 214 to allow interactions between microservices of the operation flow but to restrict ingress or egress between a first microservice (of the operation flow) and another set of microservices not employed during the flow. In another example, using the first connections and the second connections, a network policy can be generated by the network policies generator 214 to restrict all ingress and egress of information/communication/interaction relative to the first microservice.

Put another way, as generally indicated above, the network policies generator 214 can obtain the list of peer microservices, ports, protocols and/or APIs from the network dependencies analyzer 212 and, in response, can generate one or more network policies targeting the available container orchestrator system (e.g., the container orchestrator controller 252) and/or the service mesh (e.g., service mesh 242). Regardless of the specifics of the network policy's syntax per given container orchestrator/service mesh, the network policy can be generated to incorporate information about peer microservices/external services, and/or ports and/or optionally namespaces, protocols and/or APIs.

In one or more embodiments, enforcement of the protocols and APIs can be applied only for service meshes that operate at a particular layer of a network model of the network at which the microservices are deployed.

With respect to the generation of network policies, two approaches can be employed by the network policies generator 214 for applying restrictions, such as traffic restrictions. These approaches can be employed separately and/or in combination for any one network policy generated. These approaches can comprise restricting egress (outgoing) traffic or restricting ingress (incoming) traffic. An egress restriction 334 can allow restriction of traffic also to an external service located outside a container orchestrator system or service mesh. This cannot be achieved with an ingress restriction 332 because destination is not managed by service mesh/container orchestrator. An ingress restriction 332 can allow a more defined control (than an egress restriction 334 because traffic destination is managed by the service mesh/container orchestrator. For example, using an ingress restriction 332, access to particular APIs of the first microservice can be targeted per each of the accessing clients of the first microservice. I.e we can restrict the access to very specific APIs of the target microservice per each of its accessing clients.

In one or more additional and/or alternative embodiments, a network policy generated by the network policies generator 214 can direct full or partial isolation of the first microservice, where the isolating comprises containerizing the first microservice based on the network policy (e.g., where the first microservice has been compromised by the identified intrusion).

It will be understood that any one or more of the network policies comprising any ingress and/or egress restriction can be pre-generated by the network policies generator 214, prior to an intrusion, such as based on a previous intrusion, and/or can be generated by the network policies generator 214 in response to an intrusion.

Turning now again to the previous example of the product pricer microservice, to further illustrate one or more processes of the network policies generator 214, a network policy can be applied to product-pricer pods that are identified as "source endpoints". Access of the microservice can be restricted to outbound traffic (egress) only to organizations pods to port 8080 within the previously identified namespace. In one or more embodiments, an HTTP protocol cannot be enforce where the HTTP protocol operates in a different layer of a network model not accessible to the service mesh and/or container orchestrator controller.

From the same information indicated as obtained above in the product pricer microservice example, a "destination endpoint" can be inferred, and a network policy can be applied to organizations pods with their access being restricted to inbound traffic (ingress) only from product pricer pods within a default namespace to port 8080 (the previously identified port).

Next, the network policies propagator 216 can be configured to generally provide one or more instructions regarding the network policy (or policies) generated by the network policies generator 214. Provision of the instructions can comprise propagating the network policy within the network and/or external to the network. Provision of the instructions can comprise applying, either directly or indirectly, the network policy within the network and/or external to the network. In one or more embodiments, a propagation by the network policies propagator 216 can comprise a request, instruction and/or the like to implement a network policy. In one or more embodiments, a propagation can comprise using an API to input the network policy against a container orchestrator or service mesh.

In one or more embodiments, the network policies propagator 216 can propagate (e.g., send, transfer, and/or the like) a network policy comprising the ingress restriction 332 and/or egress restriction 334 to the service mesh 242 directly, such as to the control plane 246 of the service mesh 242. Additionally and/or alternatively, the network policies propagator 216 can propagate (e.g., send, transfer, and/or the like) a network policy comprising the ingress restriction 332 and/or egress restriction 334 to the container orchestrator controller 252. In response, the container orchestrator controller can apply the ingress restriction 332 and/or the egress restriction 334 at the first microservice and at least one other microservice.

In one or more embodiments, the network policies propagator 216 can propagate (e.g., send, transfer, and/or the like) a network policy comprising the ingress restriction 332 and/or egress restriction 334 to an external service that has a dependency with the first microservice (e.g., the microservice having been compromised by the non-approved intrusion).

Further, it will be understood that the network policies propagator 216 can, in response to notification of an intrusion, begin to search for a network policy to employ in response to the intrusion. As noted above, such network policy can have already been pre-generated, such as by the network policies generator 214.

Example Operations

Figure 6:
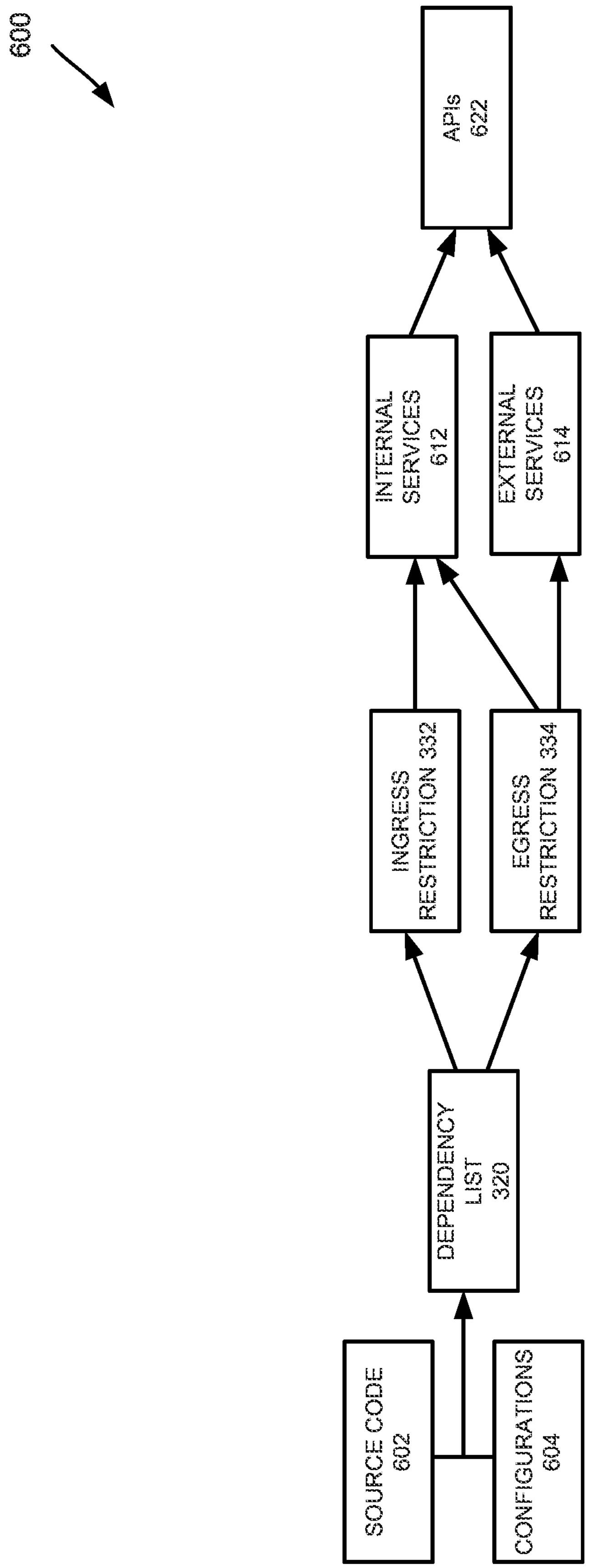
FIG. 6 illustrates yet another process flow diagram of one or more processes that can be performed by the microservice security intrusion limitation system of FIG. 3, in accordance with one or more embodiments and/or implementations described herein.

Referring now to FIG. 6, an example process flow 600 is illustrated as a summary of one or more processes, inputs and/or outputs of the security intrusion limitation system 202. As illustrated, source code 602 and/or configurations 604, among other avenues, can be employed to determine one or more dependencies and thus build a dependency list 320 by the network dependencies analyzer 212. Based on the dependency list 320, the network policies generator 214 can generate one or more network policies comprising one or more ingress restrictions 332 and one or more egress restrictions 334. The ingress restrictions 332 and egress restrictions 334 can be applied to the microservices of the network (e.g., internal services 612) directly or indirectly by the network policies propagator 216. The egress restrictions 334 can be applied to one or more external services 614 (e.g., external to the network) by the network policies propagator 216. In either case, APIs 622 can be employed to obtain resources necessary for the propagation

Additional Example Operations

Figure 7:
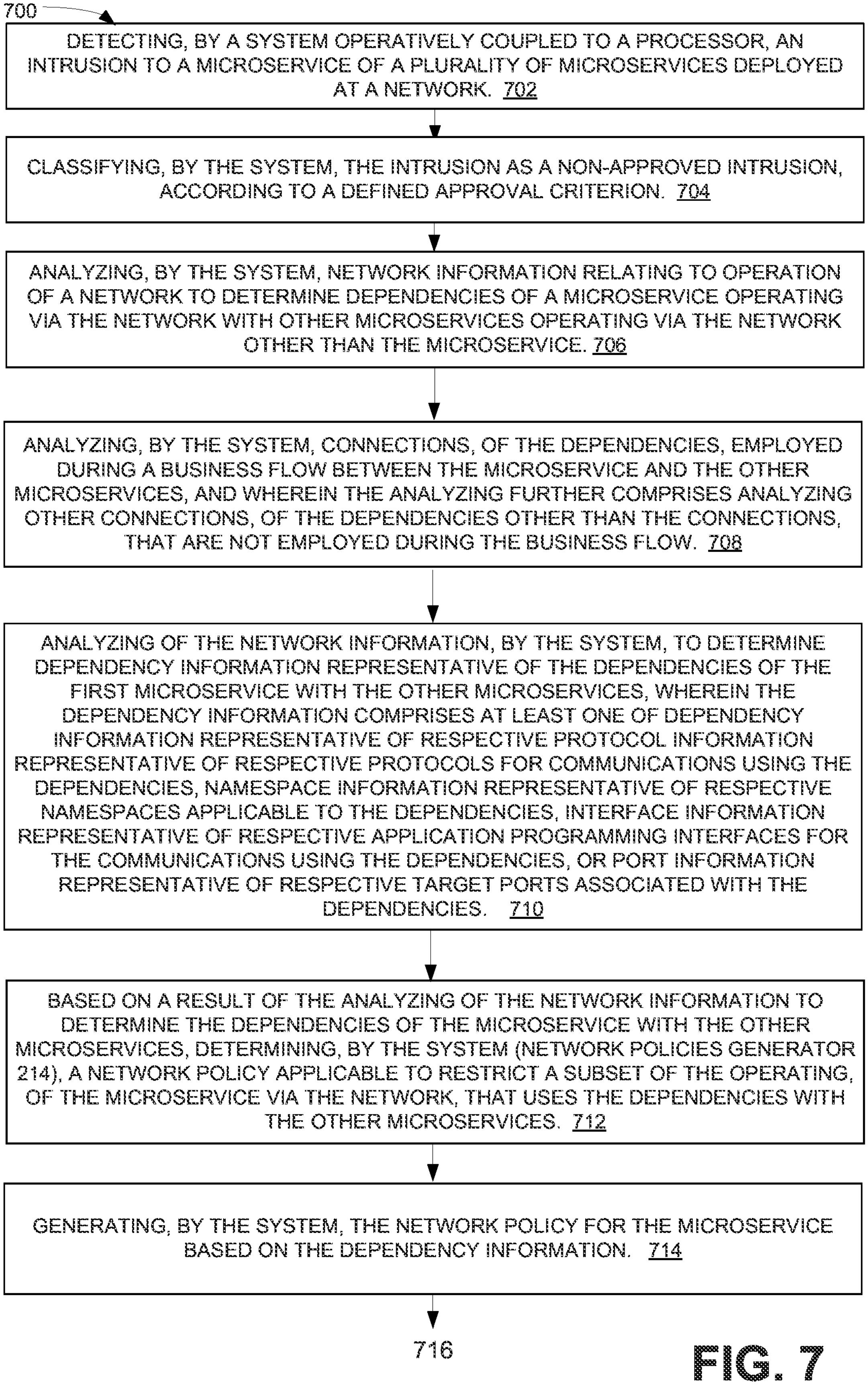
FIG. 7 illustrates a process flow diagram of a method of limitation of propagation related to a microservice security intrusion, in accordance with one or more embodiments and/or implementations described herein.
Figure 8:
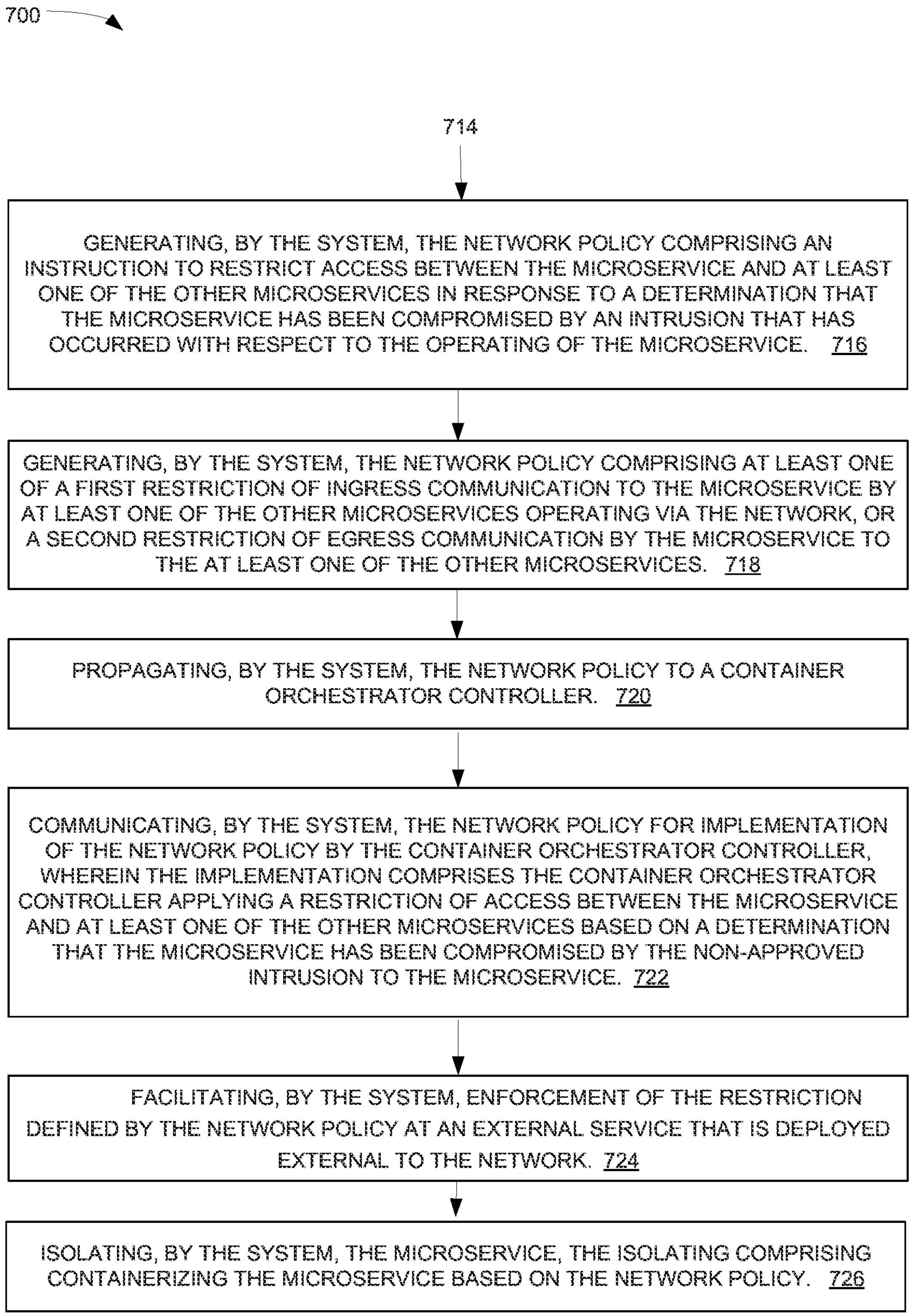
FIG. 8 illustrates a continuation of the process flow diagram of FIG. 7 of a method of limitation of propagation related to a microservice security intrusion, in accordance with one or more embodiments and/or implementations described herein.

Turning now to FIGS. 7 and 8, a process flow comprising a set of operations for detecting a microservice intrusion and addressing the intrusion are set forth relative to FIGS. 1-6. One or more elements, objects and/or components referenced in the process flow 700 can be those of schematics 100-600. Repetitive description of like elements and/or processes employed in respective embodiments is omitted for sake of brevity.

At operation 702, the process flow 700 can comprise detecting, by a system operatively coupled to a processor (e.g., detecting component 208), an intrusion to a first microservice of a plurality of microservices deployed at a network.

At operation 704, the process flow 700 can comprise classifying, by the system (e.g., intrusion classifier 210), the intrusion as a non-approved intrusion according to a defined intrusion approval criterion.

At operation 706, the process flow 700 can comprise analyzing, by the system (e.g., network dependencies analyzer 212), network information relating to operation of a network to determine dependencies of a microservice operating via the network with other microservices operating via the network other than the microservice.

At operation 708, the process flow 700 can comprise analyzing, by the system (e.g., network dependencies analyzer 212), connections, of the dependencies, employed during a business flow between the microservice and the other microservices, and wherein the analyzing further comprises analyzing other connections, of the dependencies other than the connections, that are not employed during the business flow.

At operation 710, the process flow 700 can comprise analyzing of the network information, by the system (e.g., network dependencies analyzer 212), to determine dependency information representative of the dependencies of the microservice with the other microservices, wherein the dependency information comprises at least one of dependency information representative of respective protocol information representative of respective protocols for communications using the dependencies, namespace information representative of respective namespaces applicable to the dependencies, interface information representative of respective application programming interfaces for the communications using the dependencies, or port information representative of respective target ports associated with the dependencies.

At operation 712, the process flow 700 can comprise based on a result of the analyzing of the network information to determine the dependencies of the microservice with the other microservices, determining, by the system (e.g., network policies generator 214), a network policy applicable to restrict a subset of the operating, of the microservice via the network, that uses the dependencies with the other microservices.

At operation 714, the process flow 700 can comprise generating, by the system (e.g., network policies generator 214), the network policy for the microservice based on the dependency information.

At operation 716, the process flow 700 can comprise generating, by the system (e.g., network policies generator 214) the network policy comprising an instruction to restrict access between the microservice and at least one of the other microservices in response to a determination that the microservice has been compromised by an intrusion that has occurred with respect to the operating of the microservice.

At operation 718, the process flow 700 can comprise generating, by the system (e.g., network policies generator 214), the network policy comprising at least one of a first restriction of ingress communication to the microservice by at least one of the other microservices operating via the network, or a second restriction of egress communication by the microservice to the at least one of the other microservices.

At operation 720, the process flow 700 can comprise, propagating, by the system (e.g., network policies propagator), the network policy to a container orchestrator controller.

At operation 722, the process flow 700 can comprise, communicating, by the system (e.g., network policies propagator 216), the network policy for implementation of the network policy by the container orchestrator controller, wherein the implementation comprises the container orchestrator controller applying a restriction of access between the microservice and at least one of the other microservices based on a determination that the microservice has been compromised by the non-approved intrusion to the microservice.

At operation 724, the process flow 700 can comprise facilitating, by the system (e.g., network policies propagator 216), enforcement of the restriction defined by the network policy at an external service that is deployed external to the network.

At operation 726, the process flow 700 can comprise isolating, by the system (e.g., processor 206), the microservice, the isolating comprising containerizing the microservice based on the network policy.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the FIGS. provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein relates to limiting microservice operation in response to security compromise of the microservice. A method can comprise facilitating, by a system operatively coupled to a processor, transmitting, to a container orchestrator controller that is part of a communication network, a network policy that, in response to deployment, operates to restrict, according to a restriction defined by the network policy, access between a first microservice and a second microservice of the communication network different from the first microservice, and instructing, by the system, the network policy to be deployed by the container orchestrator controller, to restrict, according to the restriction and in response to detection of a malfunction of the first microservice related to an intrusion to the first microservice, first connections employed during a flow between the first microservice and the second microservice by default and second connections that are not employed by default during the flow.

An advantage of one or more of the above-indicated method, system and/or non-transitory computer-readable medium can be lack of reliance on human intervention, and thus prevention of human error. Likewise, another advantage can be lack of use of a predictive access limitation method that can undesirably provide both false negative non-limitations and false positive limitations.

In one or more embodiments of the above-indicated method, system and/or non-transitory computer-readable medium, the network policy can comprise a limitation on ingress of access to the compromised microservice and/or a limitation on egress of access by the compromised microservice. A respective advantage can comprise the ingress and/or egress limitation being based on a defined and/or discovered dependency. This can provide for a reliable limitation that is neither overprotective, including more microservices than needed, nor underprotective, not including sufficient microservices in the limitation.

In one or more embodiments of the above-indicated method, system and/or non-transitory computer-readable medium, the framework further can provide for communication of a network policy to an external service, such as a service that is deployed external to the network. A respective advantage can comprise propagation of a network policy beyond a network, where the propagation can be self-serving, such as where the external service could be an unintended spreader of a complication caused by a microservice intrusion.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the fields of microservice architecture security for containerized environments, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze microservice dependencies and propagate network policies to microservices as the one or more embodiments described herein can facilitate these processes. And, neither can the human mind nor a human with pen and paper automatically perform one or more of the processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
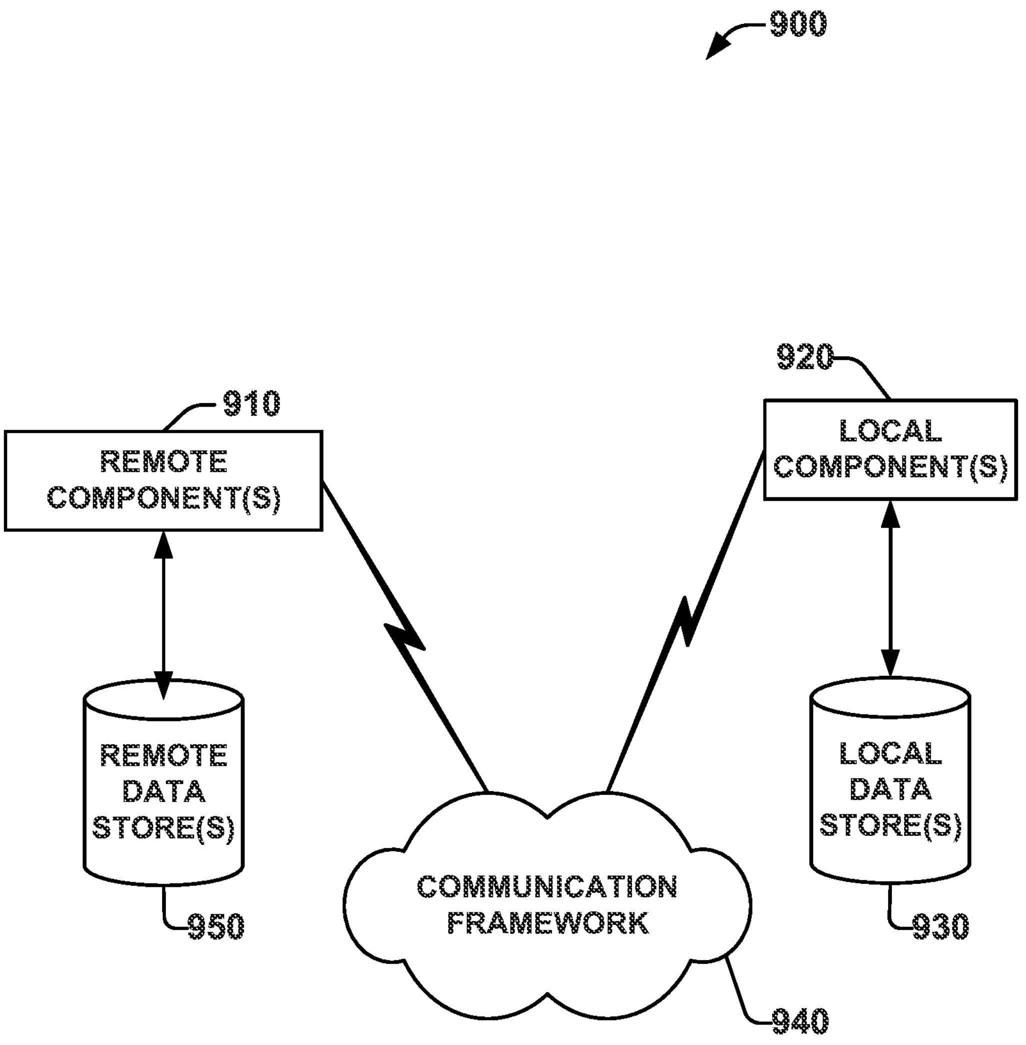
FIG. 9 illustrates a block diagram of an example operating environment into which embodiments of the subject matter described herein can be incorporated.

FIG. 9 is a schematic block diagram of an operating environment 900 with which the described subject matter can interact. The operating environment 900 comprises one or more remote component(s) 910. The remote component (s) 910 can be hardware and/or software (e.g., threads, processes, computing devices). In one or more embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In one or more embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component (s) 920 can be operably connected to one or more local data store(s) 930, that can be employed to store information on the local component(s) 920 side of communication framework 940.

Example Computing Environment

Figure 10:
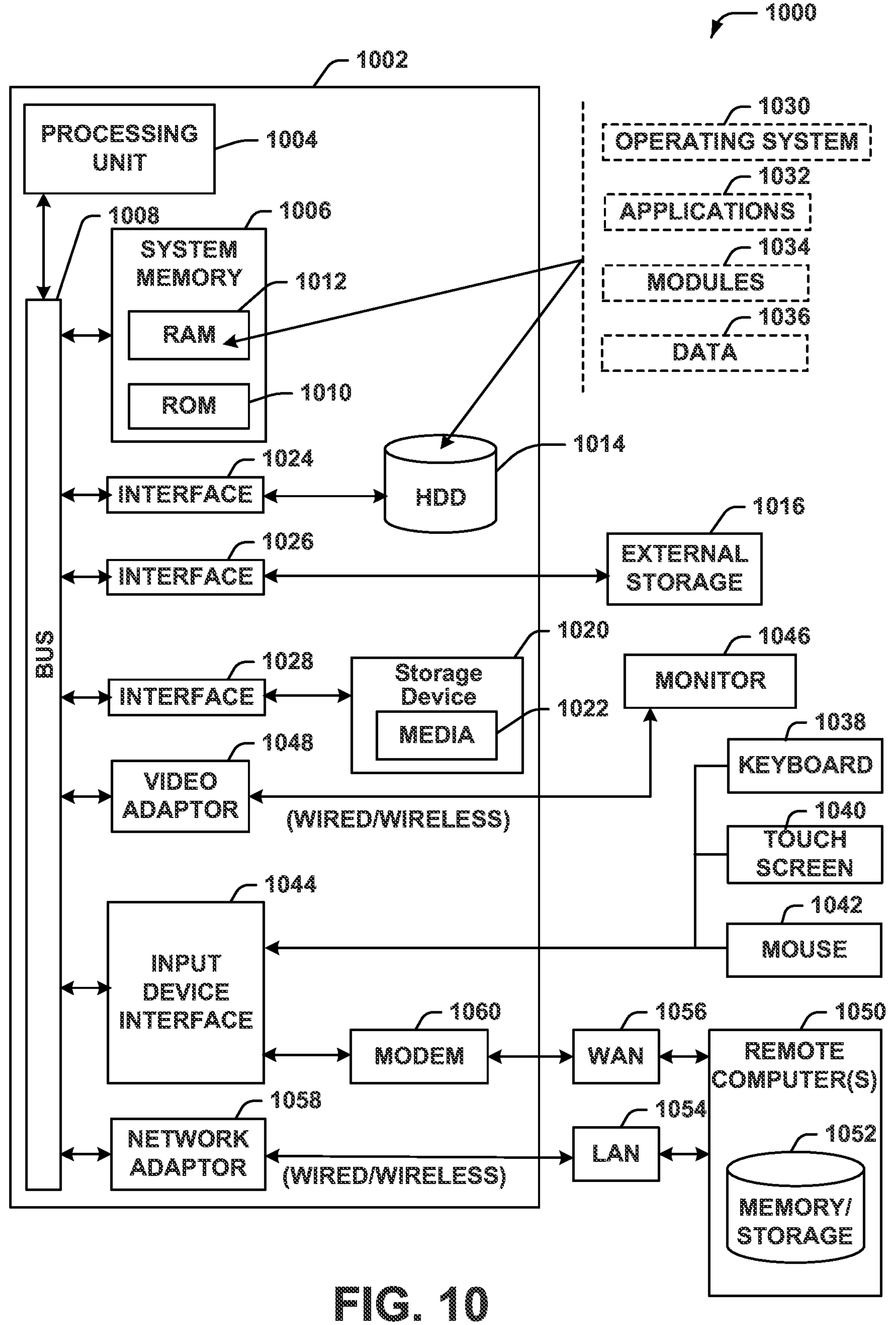
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, comprising:

analyzing network information relating to operation of a network to determine dependencies of a microservice operating via the network with other microservices operating via the network other than the microservice, wherein the analyzing comprises determining that first connections, of the dependencies, are employed by default during a business flow between the microservice and the other microservices, and determining that second connections, of the dependencies other than the first connections, are not employed by default during the business flow, wherein the first connections and the second connections are existing, connected connections;

based on the determining of the dependencies of the microservice with the other microservices, generating a network policy comprising a restriction applicable to restrict a subset of the operating of the microservice via the network, the subset comprising less than all of the operating of the microservice via the network, wherein the subset comprises the second connections, and wherein the network policy is configured to disallow continuation of the second connections;

propagating the network policy to a container orchestrator controller; and directing that the container orchestrator controller operate according to the network policy.

2. The system of claim 1, wherein the analyzing of the network information results in dependency information representative of the dependencies of the microservice with the other microservices, and wherein the determining of the network policy comprises:

generating the network policy for the microservice based on the dependency information.

3. The system of claim 1, wherein the network policy comprises an instruction to restrict access, by a connection of the first connections, between the microservice and at least one of the other microservices in response to a determination that the microservice has been compromised by an intrusion that has occurred with respect to the operating of the microservice.

4. The system of claim 1, wherein the restriction of the subset of the operating of the microservice by the network policy comprises at least one of a first restriction of ingress communication to the microservice by at least one of the other microservices operating via the network, or a second restriction of egress communication by the microservice to the at least one of the other microservices.

5. The system of claim 1, wherein the analyzing of the network information results in dependency information representative of the dependencies of the microservice with the other microservices, wherein the dependency information comprises at least port information representative of respective target ports associated with the dependencies, and wherein the port information is employed to distinguish between connections for determining the first connections from the second connections.

6. The system of claim 1, wherein the operations executed by the processor further comprise:

detecting an intrusion to the microservice; and classifying the intrusion as a non-approved intrusion according to a defined intrusion approval criterion.

7. The system of claim 6, wherein the propagating of the network policy to the container orchestrator controller comprises:

communicating the network policy for implementation of the network policy by the container orchestrator controller, wherein the implementation comprises the container orchestrator controller applying the restriction of access between the microservice and at least one of the other microservices based on a determination that the microservice has been compromised by the non-approved intrusion to the microservice.

8. The system of claim 1, wherein the operations executed by the processor further comprise:

locating the network policy having been at least partially pre-generated based on a previous intrusion to the first microservice; and generating at least a portion of the network policy based on the analyzing of the network information.

9. The system of claim 1, wherein the second connections, of the dependencies other than the first connections, that are not employed by default during the business flow between the microservice and the other microservices, comprise connections optionally used during the business flow, and wherein the restriction of access further applies to disallowing only one of ingress to the microservice or egress from the microservice by the first connections.

10. The system of claim 1, wherein the restriction of access further applies to disallowing only one of ingress to the microservice or egress from the microservice by the first connections.

11. The system of claim 1, wherein the operations executed by the processor further comprise:

applying the network policy based on identification of an intrusion that has occurred with respect to the operating of the microservice; and applying a secondary policy based on a determined level of severity of the intrusion, wherein the secondary policy comprises further disallowing only a subset of the first connections.

12. The system of claim 1, wherein the analyzing of the network information results in dependency information representative of the dependencies of the microservice with the other microservices, wherein the dependency information comprises at least namespace information representative of respective namespaces applicable to the dependencies, wherein the namespace information is employed to distinguish between connections for determining the first connections from the second connections, and wherein the namespace defined in a uniform resource locator (URL) in a configuration file of the microservice has priority for being employed over another namespace received from a continuous integration/continuous deployment (CI/CD) employed by service mesh corresponding to the microservice.

13. The system of claim 1, wherein the analyzing of the network information results in dependency information representative of the dependencies of the microservice with the other microservices, wherein the dependency information comprises at least namespace information representative of respective namespaces applicable to the dependencies, wherein the namespace information is employed to determine one or more third connections, of the dependencies, different from the first connections and from the second connections, wherein the one or more third connections correspond to an external service that is external to the network, and wherein the network policy further comprises maintaining the one or more third connections regardless of relation to the business flow.

14. The system of claim 1, wherein the operations executed by the processor further comprise:

updating a determination of the first connections and the second connections based on an update or training of the microservice, wherein the updating the determination comprises adding or removing a connection from the first connections or the second connections.

15. A method, comprising:

analyzing, by a system comprising at least one processor, network information relating to operation of a network to determine dependencies of a microservice operating via the network with other microservices operating via the network other than the microservice, wherein the analyzing comprises determining that first connections, of the dependencies, are employed by default during a business flow between the microservice and the other microservices, and determining that second connections, of the dependencies other than the first connections, are not employed by default during the business flow, wherein the first connections and the second connections are existing, connected connections;

based on the determining of the dependencies of the microservice with the other microservices, generating, by the system, a network policy comprising a restriction applicable to restrict a subset of the operating of the microservice via the network, the subset comprising less than all of the operating of the microservice via the network, wherein the subset comprises the second connections, and wherein the network policy is configured to disallow continuation of the second connections;

propagating, by the system, the network policy to a container orchestrator controller; and directing, by the system, that the container orchestrator controller operate according to the network policy.

16. The method of claim 15, wherein the analyzing of the network information results in dependency information representative of the dependencies of the microservice with the other microservices, and wherein the determining of the network policy comprises:

generating the network policy for the microservice based on the dependency information.

17. The method of claim 15, wherein the network policy comprises an instruction to restrict access, by a connection of the first connections, between the microservice and at least one of the other microservices in response to a determination that the microservice has been compromised by an intrusion that has occurred with respect to the operating of the microservice.

18. A non-transitory machine-readable medium, comprising executable instructions that, when executed by at least one processor, facilitate performance of operations, the operations comprising:

analyzing network information relating to operation of a network to determine dependencies of a microservice operating via the network with other microservices operating via the network other than the microservice, wherein the analyzing comprises determining that first connections, of the dependencies, are employed by default during a business flow between the microservice and the other microservices, and determining that second connections, of the dependencies other than the first connections, are not employed by default during the business flow, wherein the first connections and the second connections are existing, connected connections;

based on the determining of the dependencies of the microservice with the other microservices, generating a network policy comprising a restriction applicable to restrict a subset of the operating of the microservice via the network, the subset comprising less than all of the operating of the microservice via the network, wherein the subset comprises the second connections, and wherein the network policy is configured to disallow continuation of the second connections;

propagating the network policy to a container orchestrator controller; and directing that the container orchestrator controller operate according to the network policy.

19. The non-transitory machine-readable medium of claim 18, wherein the analyzing of the network information results in dependency information representative of the dependencies of the microservice with the other microservices, and wherein the determining of the network policy comprises:

generating the network policy for the microservice based on the dependency information.

20. The non-transitory machine-readable medium of claim 18, wherein the network policy comprises an instruction to restrict access, by a connection of the first connections, between the microservice and at least one of the other microservices in response to a determination that the microservice has been compromised by an intrusion that has occurred with respect to the operating of the microservice.

* * * * *